(12) United States Patent
Smith

(10) Patent No.: US 10,353,717 B2
(45) Date of Patent: Jul. 16, 2019

(54) BUILD-TIME MEMORY MANAGEMENT FOR MULTI-CORE EMBEDDED SYSTEM

(71) Applicant: Imagination Technologies Limited, Kings Langley (GB)

(72) Inventor: Christopher Philip Smith, Bristol (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/702,877

(22) Filed: Sep. 13, 2017

(65) Prior Publication Data

US 2018/0074835 A1 Mar. 15, 2018

(30) Foreign Application Priority Data

Sep. 13, 2016 (GB) .................................. 1615562.4

(51) Int. Cl.
| | |
|---|---|
| *G06F 3/06* | (2006.01) |
| *G06F 9/445* | (2018.01) |
| *G06F 9/448* | (2018.01) |
| *G06F 13/16* | (2006.01) |

(52) U.S. Cl.
CPC ........ *G06F 9/44521* (2013.01); *G06F 3/0607* (2013.01); *G06F 3/068* (2013.01); *G06F 3/0631* (2013.01); *G06F 3/0644* (2013.01); *G06F 9/4488* (2018.02); *G06F 9/44563* (2013.01); *G06F 13/1663* (2013.01)

(58) Field of Classification Search
CPC ....................................................... G06F 13/00

USPC ......................................................... 717/164
See application file for complete search history.

(56) References Cited

U.S. PATENT DOCUMENTS

| | | | |
|---|---|---|---|
| 5,778,231 A | 7/1998 | Van Hoff et al. | |
| 2014/0130013 A1* | 5/2014 | Lim ......................... | G06F 8/71 717/121 |
| 2016/0179502 A1* | 6/2016 | Cawley ..................... | G06F 8/54 717/121 |
| 2018/0082397 A1* | 3/2018 | Bobrovsky ............... | G06T 1/20 |

FOREIGN PATENT DOCUMENTS

CN 101782860 A 7/2010

* cited by examiner

*Primary Examiner* — John Q Chavis
(74) *Attorney, Agent, or Firm* — Vorys, Sater, Seymour and Pease LLP; Vincent M DeLuca

(57) ABSTRACT

Methods for generating executable files for two or more independent programs to be run on separate processor cores of an embedded system wherein the programs share data/code via shared memory by symbolically referring to data/code generated by another program. The methods implement a two-stage link process. In the first link stage addresses in shared memory are allocated to the shared code and data of the independent programs, and the allocated memory addresses are stored in a library. In a second link stage executable code and initialized data is generated for the non-shared code and initialized data of each independent program which is linked to the shared data/code by the addresses in the library.

19 Claims, 7 Drawing Sheets

US 10,353,717 B2

BUILD-TIME MEMORY MANAGEMENT FOR MULTI-CORE EMBEDDED SYSTEM

BACKGROUND

An embedded system, in contrast to a general purpose computing-based system, is a computing-based system that is designed for a specific purpose, and is typically constrained in its size, power requirements and/or features in comparison to general purpose computing-based systems.

An embedded system that comprises multiple processor cores that run separate programs that write to and read from shared memory typically comprise means to manage and allocate the shared memory to the different programs. For example, such embedded systems may comprise a memory management unit (MMU) to dynamically manage and allocate the shared memory to the different programs, or, they may be configured such that the separate programs may be run under a common operating system instance that dynamically manages and allocates the shared memory to the different programs.

The embodiments described below are provided by way of example only and are not limiting of implementations which solve any or all of the disadvantages of known methods and systems for managing shared memory in a multi-core embedded system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and systems for generating executable code and initialised data for two or more independent programs to be run on separate processor cores of an embedded system wherein the programs share data/code via shared memory by symbolically referring to data/code in another program. The methods implement a two-stage link process. In the first link stage addresses in shared memory are allocated to the shared code and data of the independent programs, and the allocated memory addresses are stored in a library. In a second link stage executable code and initialised data are generated for the non-shared code and initialised data of each independent program which is linked to the shared data/code by the addresses in the library.

The library may be generated in the first link stage by receiving information identifying shared symbols in the independent programs (i.e. symbols for which the associated data/code is to be shared between the programs); allocating each identified shared symbol an address in shared memory; and generating a fully linked executable file (the library) comprising metadata that identifies the allocated memory addresses, and, executable code and initialised data for the identified symbols.

A first aspect provides a computer-implemented method of storing a plurality of computer programs in memory of an embedded system comprising a plurality of processor cores, each of the plurality of computer programs to be run on a different processor core of the plurality of processor cores, the method comprising: receiving object code for each of the plurality of computer programs, the object code for each computer program comprising one or more instructions that refers to a shared symbol defined in another of the plurality of computer programs; receiving a symbol description that identifies: (i) shared symbols defined in the plurality of computer programs for which shared data or code associated with the shared symbol is to be stored in shared memory of the embedded system, and (ii) a location in the shared memory of the embedded system where the shared data or code associated with each of the identified shared symbols is to be stored; generating, based on the symbol description, a first linker script to cause a linker to allocate memory addresses to the shared symbols identified in the symbol description according to the locations identified in the symbol description; causing a linker, in a first link stage, to generate, based on the first linker script and the object code for the plurality of computer programs, a library comprising shared memory addresses allocated to the shared symbols identified in the symbol description according to the locations identified in the symbol description; causing a linker, in a second link stage, to generate, based on the object code for each of the plurality of computer programs and the library, an executable file for each of the plurality of computer programs comprising executable code for the non-shared code and data of the computer program that is linked to the shared code and/or data via the shared memory addresses in the library; and loading the executable code from the executable files into the memory of the embedded system.

A second aspect provides a system to store a plurality of computer programs in memory of an embedded system comprising a plurality of processor cores, each of the plurality of computer programs to be run on a different processor core of the plurality of processor cores, the system comprising: a linker; a linker driver configured to: receive object code for each of the plurality of computer programs, the object code for each computer program comprising one or more instructions that refers to a shared symbol defined in another of the plurality of computer programs; receive a symbol description that identifies: (i) shared symbols defined in the plurality of computer programs in which associated shared code or data is to be stored in shared memory of the embedded system, and (ii) locations in the shared memory of the embedded system where the shared data or code associated with the identified shared symbols is to be stored; generate, based on the symbol description, a first linker script to cause the linker to allocate memory addresses to the shared symbols identified in the symbol description according to the locations identified in the symbol description; cause the linker to generate in a first link stage, based on the first linker script and the object code for the plurality of computer programs, a library comprising shared memory addresses allocated to the shared symbols identified in the symbol description according to the locations identified in the symbol description; and cause the linker to generate in a second link stage, based on the object code for each of the plurality of computer programs and the library, an executable file for each of the plurality of computer programs comprising executable code for the non-shared code and data of the computer program that is linked to the shared code and data via the shared memory address in the library; and a loader configured to load the executable code of the executable files into memory of the embedded system.

A third aspect provides an embedded system comprising a plurality of processor cores each configured to execute a separate computer program, the embedded system obtained by performing the method of the first aspect to load executable code representing each of the programs into a memory of the embedded system.

The embedded system may be embodied in hardware on an integrated circuit. There may be provided a method of manufacturing, at an integrated circuit manufacturing system, an embedded system. There may be provided an integrated circuit definition dataset that, when processed in an integrated circuit manufacturing system, configures the system to manufacture an embedded system. There may be provided a non-transitory computer readable storage medium having stored thereon a computer readable description of an integrated circuit that, when processed, causes a layout processing system to generate a circuit layout description used in an integrated circuit manufacturing system to manufacture an embedded system.

There may be provided an integrated circuit manufacturing system comprising: a non-transitory computer readable storage medium having stored thereon a computer readable integrated circuit description that describes the embedded system, a layout processing system configured to process the integrated circuit description so as to generate a circuit layout description of an integrated circuit embodying the embedded system; and an integrated circuit generation system configured to manufacture the embedded system according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described, by way of example, with reference to the following drawings, in which.

Figure 1:
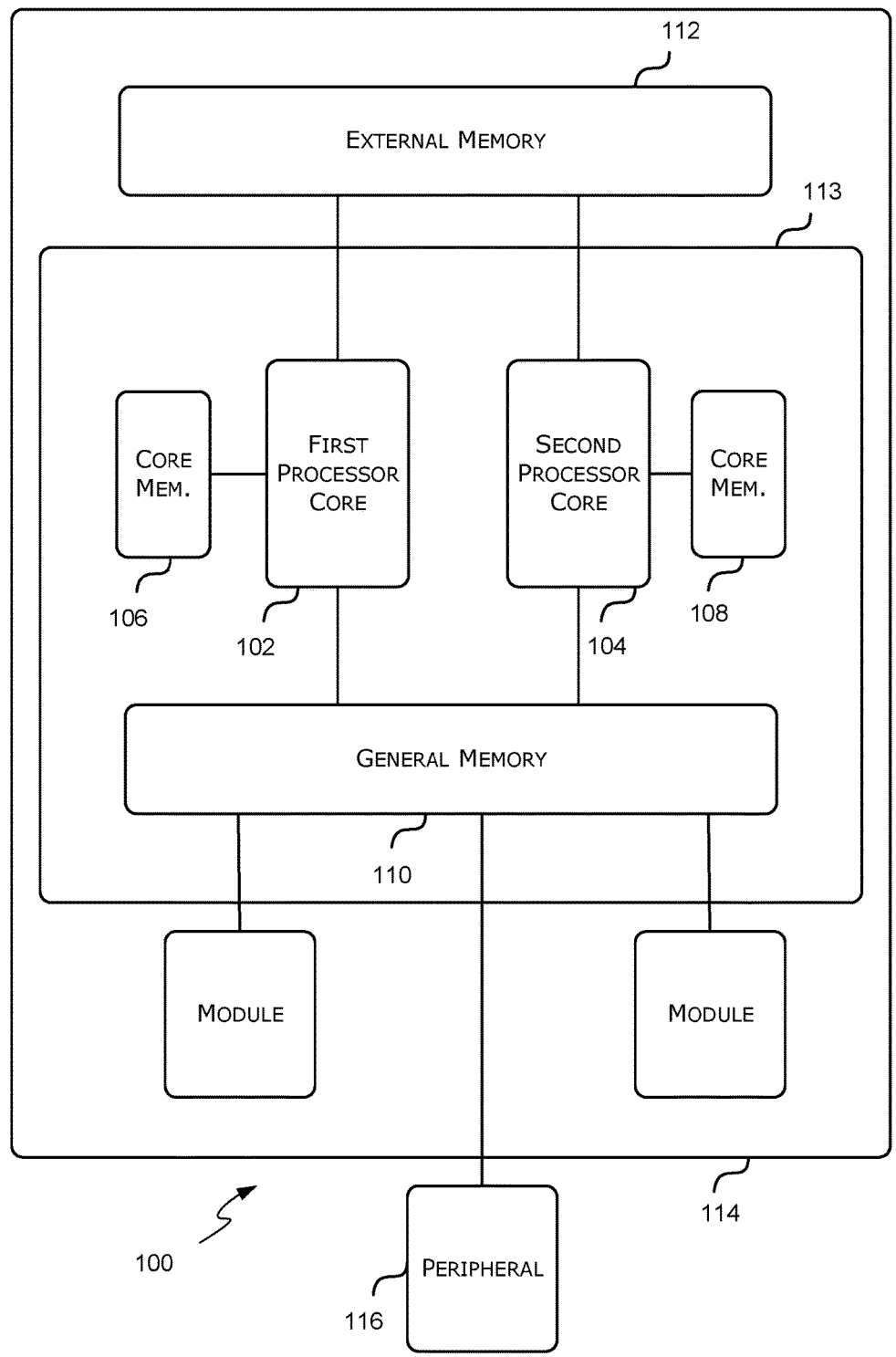
FIG. 1 is a block diagram of an example multi-core embedded system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As described above, a multi-core embedded system may be configured so that each core runs a separate program that writes and/or reads data and code to/from shared memory.

In some cases it may be desirable for the programs run by the different processor cores to share data and/or code via the shared memory. In particular, it may be desirable for the programs to access data and/or code stored in the shared memory by another program. To enable such data/code sharing between programs the source code for the programs may symbolically refer to data/code of another program.

The term "symbolically refer" is used herein to mean that the source code and/or object code refers to data and or code generated by a program using a symbol. A symbol is a name or string used to refer to a variable, subroutine etc. and typically has a size or space requirement associated therewith. For example, if program A defines variable "X" and program B includes instructions that refer to variable "X" then program B symbolically refers to the variable. Each symbol has the potential to have a portion of memory (defined by a memory address) associated or allocated to it.

A memory address must be allocated to each symbol before the program can be run or executed by a processor. Symbols can be allocated memory addresses at build time (which is referred to as static linking); or they may be allocated at run time by an operating system and/or a memory-management unit (MMU) (which is referred to as dynamic linking).

Where a multi-core embedded system does not include an MMU, and the programs are run under different (or no) operating system instances, the symbols in the programs are statically-linked at build time (via a linker) to addresses in memory. However, if a program refers to a symbol (e.g. "X") that was not generated/defined by that program (i.e. the symbol was generated/defined by another program) then the linker will not be able to allocate the correct memory address for the symbol (e.g. "X") since the linker does not know where the symbol will be placed in memory by the other program.

Accordingly, described herein are methods and systems for generating executable code and initialised data for two or more independent programs to be run on separate processor cores of an embedded system wherein the programs share data/code via shared memory by symbolically referring to data/code in another program. The methods implement a two-stage link process. In the first link stage addresses in shared memory are allocated to the shared data and code of the independent programs, and the allocated memory addresses are stored in a library. In a second link stage executable code and initialised data are generated for the non-shared code and data of the independent programs which is linked to the shared data and/or code by the addresses in the library.

The library may be generated in the first link stage by receiving information identifying shared symbols in the independent programs (i.e. symbols for which the associated code or data is to be shared between the independent programs); allocating each identified shared symbol an address in shared memory; and generating a fully linked executable file (the library) comprising metadata that identifies the memory address allocated to the shared symbols, and, optionally, executable code and initialised data associated with the identified shared symbols.

This allows the two statically-linked programs to share data and/or code via the shared memory, while ensuring that the programs will not use the same portion of shared memory for different purposes (e.g. for unrelated data).

Reference is first made to FIG. 1 which illustrates an example multi-core embedded system 100 without an MMU where the processor cores run separate programs, under different (or no) operating system instances, that share data and/or instructions (e.g. code) between them. As described above, an embedded system is a computing-based system that is designed for a specific purpose and is typically constrained in its size, power requirements and/or features in comparison to general purpose computing-based systems. A non-limiting example of an embedded system is a radio processing unit (RPU) which is specifically designed to process radio signals.

The multi-core embedded system 100 of FIG. 1 comprises two processor cores 102 and 104. The term "processor core" is used herein to mean an independent processing unit that is capable of reading and executing computer-readable instructions. Processor cores include, but are not limited to, central processing units (CPUs) and graphics processing units (GPUs). While the example multi-core embedded system 100 of FIG. 1 comprises two processor cores 102 and 104 it will be evident to a person of skill in the art that the methods and techniques described herein may be equally applied to embedded systems with more than two processor cores.

Each processor core 102 and 104 has access to private memory 106 and 108 and shared memory 110 and 112. The private memory 106 is 108 private to each processor core 102 or 104 meaning that only one processor core 102 or 104 can access the private memory 106 or 108. In contrast, both processor cores 102 and 104 can access the shared memory 110 and 112.

In the example shown in FIG. 1 each processor core 102 and 104 has access to its own private core memory 106 and 108. The term "core memory" is used herein to describe memory that is situated in close proximity to the processor core 102 or 104 to enable the processor core 102 or 104 to quickly access the information (e.g. computer executable instructions and data elements) stored therein. For example, some core memories are designed to provide the associated processor core 102 or 104 with single clock cycle access (e.g. read from, or write to) to the core memory 106 or 108. The core memory 106 and 108 may be implemented using any suitable type of memory such as, but not limited to, random access memory (RAM).

In the example shown in FIG. 1 there are two types of shared memory: general memory 110 and external memory 112. The general memory 110 is memory that is on the same system-on-chip (SoC) 113 as the processor cores 102 and 104 and connected, via, for example a bus, whereas the external memory 112 is external to the SoC, but on the same printed circuit board (PCB) 114 as the SoC 113. As a result, access to the general memory 110 is typically faster than access to the external memory 112. The general memory 110 may be implemented using any suitable type of memory such as, but not limited to, RAM. For example, where the general memory 110 is implemented using RAM it may be referred to as Global RAM (GRAM). Similarly, the external memory 112 may be implemented using any suitable type of memory such as, but not limited to, double data rate synchronous dynamic random access memory (DDR SDRAM). It will be evident to a person of skill in the art that the general memory 110 and external memory 112 and their relationship to the processor cores 102 and 104 are simply examples and the shared memory may be implemented in any suitable form and with any suitable physical and logical relationships with respect to the processor cores 102 and 104.

Typically each shared memory 110 and 112 is mapped into the processor cores 102 and 104 at the same point in their address map. For example, the general memory 110 may be mapped into both processor cores 102 and 104 at address 0xb400 and the external memory 112 may be mapped into both processor cores 102 and 104 at address 0xb000. In some cases one or more of the shared memories may appear to the processor cores 102 and 104 under a plurality of aliases which may use different offsets from the base of the alias to access the same physical memory. For example, in some cases the general memory 110 may be mapped into both processor cores 102 and 104 at address 0xb400 and using three aliases, which have, for example, bases 0xb500, 0xb600 and 0xb700 respectively. In some cases one or more of the aliases may be cached and/or one or more of the aliases may be uncached.

The private and shared memories 106, 108, 110 and 112 are used to store instructions (i.e. code) and data for programs that are executed by the processor cores 102 and 104.

In the example embedded system 100 of FIG. 1 each processor core 102 and 104 is configured to execute an independent program. The instructions (i.e. code) of each program are typically stored in the core memory 106 or 108 of the appropriate processor core 102 or 104. For example, the instructions for a first program executed by the first processor core 102 may be stored in the first core memory 106 and the instructions for a second program executed by the second processor core 104 may be stored in the second core memory 108.

When a processor core 102 or 104 executes the executable instructions of a program they cause the processor core 102 or 104 to write data/code to, and read data/code from, the corresponding private memory 106 or 108 and/or the shared memory 110 and 112. For example, the executable instructions for a first program may cause the first processor core 102 to store a value for a variable, referred to as "x", at an address in private memory 106 or shared memory 110, 112; and subsequently cause the first processor core 102 to read the value of the variable "x" from the same address in the private memory 106 or shared memory 110, 112.

In a general purpose computer, such as computing-based system 600 described below with reference to FIG. 6, if a memory is used by two independent programs it is dynamically managed by an MMU and/or common operating system instance. For example, an operating system may implement dynamic linking wherein addresses in memory are dynamically allocated to a program at runtime before running the program. However, due to the constraints on the embedded system 100 with respect to space, size, power requirements and/or other features the embedded system 100 does not implement an MMU or common operating system instance.

Since the embedded system 100 does not comprise a memory management unit (MMU), or a common operating system instance shared between processor cores 102 and 104, to dynamically manage and allocate memory to the different programs at runtime, the executed instructions that are stored in memory are hard-coded with the addresses of the private and shared memories 106, 108, 110 and 112 used to store data/code in memory. Accordingly, during the build process (i.e. when computer executable instructions representing the programs are generated from source code representing the programs) each data/code element to be stored in memory is allocated an address in memory and that address is hard-coded in the executable instructions.

For example, if the source code includes an instruction such as x=5, and variable x is assigned address 0x8004 then the executable instructions may include an instruction sequence such as:

```
LOADADDRESS $r0, 0x8004
STORE $r0, 5
``` which causes the fixed address 0x8004 to be loaded into register 0 and then used as the destination to store the value five.

Since both the first program (the program executed by the first processor core 102) and the second program (the program executed by the second processor core 104) can cause data/code to be written to the shared memory 110 and 112 care has to be taken at build time to ensure that the executable instructions for both programs do not cause the different processor cores 102 and 104 to use the same address in shared memory 110 and 112 for unrelated data and code. For example, care has to be taken to ensure that the executable instructions for the first and second programs do not both use address 0x8004 for unrelated variables x and y respectively.

Generally the data/code that is placed in shared memory 110 and 112 is private to a single program, but may be placed in shared memory 110 and 112 for certain reasons. For example, in some cases there may be a limited amount of private memory which requires storing some of the code/data of a program in shared memory. In other cases, code/data of a program may be stored in shared memory to make it available to other hardware elements of the system since the private memory is only available to a specific processor core. This allows code/data that is private to an application to not necessarily be private to a specific processor core. For example, this allows data generated by a program to be accessed and/or used by another hardware element such as an independent digital signal processor (DSP), a direct memory access (DMA) engine, an error correction block etc. However, in some cases, it may be desirable for the programs (e.g. first program (the program executed by the first processor core 102) and the second program (the program executed by the second processor core 104)) to share data and/or code.

For example, in the embedded system 100 of FIG. 1, both processor cores 102 and 104 may need to make use of a single hardware peripheral 116. Where two processor cores 102 and 104 are able to execute the same instruction sequences to achieve the same result, the code they execute to control that peripheral may be the same. In this case, a single copy of the code may be stored in the shared memory which can be accessed by both processor cores 102 and 104. In another example, the processor cores 102 and 104 may want to ensure that their interactions with the shared peripheral 116 do not conflict with each other. One way to achieve that would be through a piece of data memory both processor cores 102 and 104 can access which is used to indicate that the peripheral 116 is currently in use.

When both the first and second programs use the same code to control operation of the peripheral 116 it may be more efficient for one program (e.g. the first program) to include the code and then place the code in shared memory 110 or 112. Both programs (e.g. the first and second programs) can then access the code in the shared memory 110 or 112. It will be evident to a person skilled in the art that this is an example only and that the two programs may share different data and/or code.

Such sharing of data and/or code may be implemented by allowing the programs to symbolically refer to data and/or code in another program. As described above, the term "symbolically refer" is used herein to mean that the source code (and thus the object code) refers to code or data in a program using a name assigned to the data and/or code in that program.

Figure 2:
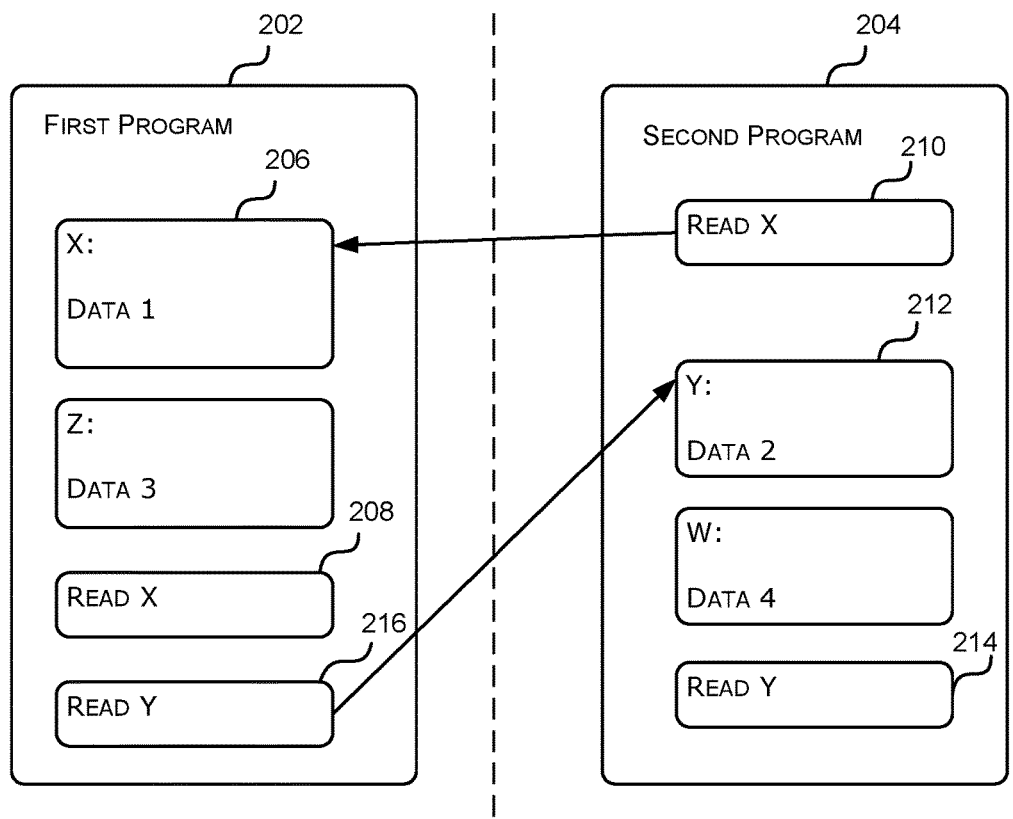
FIG. 2 is a schematic diagram illustrating the source code of two programs that symbolically reference data/code in the other program.

Reference is now made to FIG. 2 which illustrates the "symbolic reference" concept. In particular, FIG. 2 illustrates the source code for a first program 202 and the source code for a second program 204. The source code for the first program 202 defines a block of data ("Data 1") 206 which has been assigned the name or symbol "X". The source code for the first program 202 also includes a block of code 208 to access that data ("Data 1") using the name "X" to refer to it which is a symbolic reference to the data ("Data 1").

Since the symbol "X" referred to in the block of code 208 is created or defined in the same program this is referred to herein as an internal symbolic reference. Source code that includes one or more internal symbolic references can typically be statically linked at build time using a normal link process since the linker can allocate an address to the symbol which will be incorporated in the executable instructions of the program to cause the code/data associated with the symbol to be accessed via the allocated address.

Now referring back to FIG. 2, the source code for the second program 204 also includes a block of code 210 to access the block of data ("Data 1") 206 in the first program 202 using the name "X". Since the symbol "X" is not created or defined in the second program 204 this is referred to herein as an external symbolic reference.

Source code that includes one or more external symbolic references cannot be statically linked via a normal link process since the linker will not know at build time where the symbol will be placed in memory by the other program (i.e. the program that created or defined the symbol).

Similarly, the second program 204 includes a block of data ("Data 2") 212 which has been assigned the symbol "Y" and a block of code 214 that includes an internal symbolic reference to "Y". The first program 202 also includes a block of code 216 that has an external symbolic reference to "Y".

If the sharing of data/code is only one-way between programs—e.g. only a first program can access data/code generated by a second program, but the second program cannot access data generated by the first program—then the program that shares the data could be built first and then once built the addresses assigned to the shared symbols can be used to build the executable instructions for the other program. However, where the sharing of data/code is two-way between programs as shown in FIG. 2—e.g. both first and second programs can access data/code generated by the other program—a more complicated means for building the executable instructions for the programs is required to ensure that the two programs can correctly access each other's data/code in shared memory.

For reasons of namespacing it is not desirable for programs to share all of their data and/or code. In particular, the symbol names used in a particular program define the program's namespace. Within a given namespace two items of the program (code or data) cannot be allocated the same symbol name. If two programs share a symbol (i.e. both programs can refer to the same symbol to access the same code/date) then the symbol will appear in both namespaces and thus both programs are unable to use that symbol for anything else. There are also typically a set of standard symbols which each program uses to refer to certain functionality which is specific to each program. For example, each program may have a "main" function which is the specific entry point of that program. Therefore, so as to not to unduly restrict the symbols available to each program only a subset of the symbols of a program are typically shared with other programs.

Accordingly, described herein are methods and systems for generating executable code and initialised data for two or more independent programs to be run on separate processor cores of an embedded system wherein the programs share data/code via shared memory by symbolically referring to data/code in another program. The methods implement a two-stage link process. In the first link stage addresses in shared memory are allocated to the shared data and code of the independent programs, and the allocated memory addresses are stored in a library. In a second link stage executable code and initialised data are generated for the non-shared code and data of the independent programs which is linked to the shared data/code by the addresses in the library.

The library may be generated in the first link stage by receiving information identifying shared symbols in the independent programs (i.e. symbols for which the associated data/code is to be shared by two or more independent programs); allocating each identified shared symbol an address in shared memory; and generating a fully linked executable file (the library) comprising metadata that identifies the shared memory addresses allocated to the shared symbols, and, optionally, executable code and initialised data for the identified shared symbols.

This allows the two statically-linked programs to share data and/or code, while ensuring that the programs will not use the same portion of shared memory for different purposes (e.g. to store unrelated data).

Figure 3:
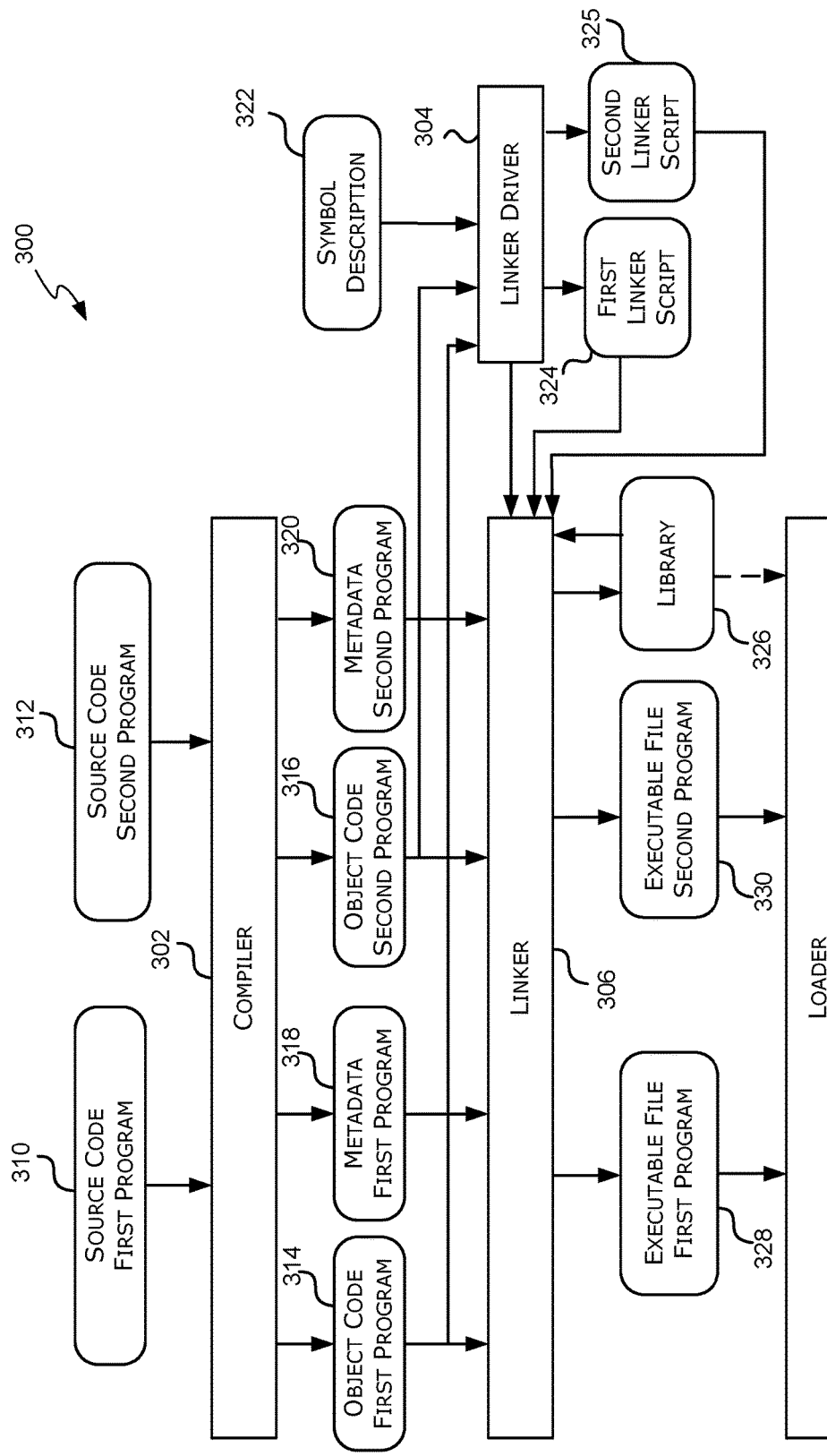
FIG. 3 is a block diagram of an example system for generating executable code and initialised data for two different programs run on two different processor cores that share data and/or code via a shared memory.

Reference is now made to FIG. 3 which illustrates an example system 300 for generating executable code and initialised data for two or more independent programs to be run on separate processor cores of an embedded system wherein the programs share data/code via shared memory by symbolically referring to data/code in another program.

The system 300 comprises a compiler 302, a linker driver 304, a linker 306 and a loader 308. The system 300 may be implemented using one or more general purpose computing-based devices, such as the computing-based device 600 described below with reference to FIG. 6.

The compiler 302 is a software program or tool that is configured to convert source code into object code. As is known to those of a skill in the art source code is a representation of a program in a high-level programming language, such as, but not limited to C, which is readable by humans, but not a processor core. In contrast, object code is a representation of a program in a lower level language, such as machine language, which is readable by a processor core, but typically requires additional information, such as data addresses to make it executable by a processor core.

The compiler 302 also typically generates metadata that identifies the symbols in the object code and their type (e.g. executable instructions, initialised data, uninitialised data, read-only data etc.) and size. In some cases the compiler 302 generates a single file, such as an executable and linkable format (ELF) file, that contains both the object code and the metadata.

The compiler 302 of FIG. 3 receives source code 310 for a first program (e.g. the source code for the first program 202 of FIG. 2) to be executed by a first processor core (e.g. processor core 102 of FIG. 1) and source code 312 for a second program (e.g. the source code for the second program 204 of FIG. 2) to be executed by a second processor core (e.g. the second processor core 104 of FIG. 1). The source code 310 for the first program includes one or more instructions that symbolically refer to data and/or code of the second program, and the source code 312 for the second program includes one or more instructions that symbolically refer to data/code of the first program.

For example, as described with reference to FIG. 2 the first program 202 may comprise a block of data ("Data 1") 206 which is referred to by the symbol "X" and the second program 204 may comprise a block of code 210 to access "X" even though the second program 204 does not know what or where "X" is. Similarly, as shown in FIG. 2, the second program 204 may comprise a block of data ("Data 2") 212 which is referred to by the symbol "Y" and the first program 202 may comprise a block of code 216 to access "Y" even though the first program 202 does not know what or where "Y" is.

The compiler 302 generates (i) object code 314 and metadata 318 for the first program from the source code 310 for the first program; and (ii) object code 316 and metadata 320 for the second program from the source code 312 for the second program. The compiler 302 may generate the object code 314, 316 and metadata 318, 320 for the first and second programs in any order. For example, the compiler 302 may first generate the object code 314 and metadata 318 for the first program, and then generate the object code 316 and metadata 320 for the second program or vice versa.

Furthermore, although FIG. 3 shows a single compiler 302 that generates the object code 314, 316 and metadata 318, 320 for both the first and second programs, in other examples separate compilers may be used to generate the object code and metadata for the first and second programs. For example, a first compiler may be used to generate the object code 314 and metadata 318 for the first program from the source code 310 for the first program, and a second separate compiler may be used to generate the object code 316 and metadata 320 for the second program from the source code 312 for the second program.

While the object code is in machine language it cannot be executed by a processor core of an embedded system. This is because the object code does not comprise memory addresses for the symbols in the program and the embedded system does not comprise means (such as an MMU) for dynamically allocating memory address to the symbols. In this way the object code can be thought of as having holes where the memory addresses associated with the symbols are to be inserted.

Typically the object code 314 and 316 is provided to a linker 306 for generating an executable file 328 and 330 for each of the first and second programs that comprises fully linked executable code and initialised data for that program. As is known to those of skill in the art the linker 306 allocates memory addresses to symbols in the object code, generates executable code from the object code based on the allocated memory addresses, and stores the executable code and any initialised data in an executable file.

For example, if the linker 306 allocates address 0x1004 to symbol "X" then the linker 306 may generate executable code from the object code by placing the address 0x1004 in each "hole" in the object code that the metadata indicates should contain the address of symbol "X". It will be evident to a person of skill in the art that this is an example only and that the linker 306 may be configured to use other techniques to update the object code so that it references the symbols at the allocated memory addresses.

The term "executable file", which also may be referred to herein as an executable program, a program executable, or simply an executable, is a file that comprises fully linked executable code and initialised data of a program that is in a format that a processor can directly execute. An executable file may also comprise metadata that identifies the allocated memory addresses and/or instructions or information that indicates where the executable code and data is to be loaded into memory.

However, as described above, since the source code 310 and 312 for each program includes one or more symbolic references to data/code in the other program the executable files for the two programs cannot be generated through a normal link process.

Accordingly, in the embodiments described herein a software module, referred to as a linker driver 304, is used to implement a two-stage link process. In the first link stage the linker driver 304 causes the linker 306 to use a specially generated linker script 324 to identify, and allocate memory addresses to, the shared symbols in the object code 314 and 316 (i.e. the symbols for which the associated data/code is to be shared by the two programs); and generate a library 326 that identifies the shared symbols and the allocated memory addresses.

In the second link stage the linker driver 304 causes the linker 306 to generate, based on the object code 314 and 316, the library 326 and a second specially generated linker script 325, an executable file for each of the first and second programs comprising executable code and initialised data for the non-shared code and data of that program which is linked to the shared code and data via the memory addresses in the library 326. In particular, in the second link stage the memory addresses allocated to the shared symbols in the first link stage are used to fill in the "holes" in the object code created by the shared symbols.

In some examples, the linker driver 304 receives a symbol description 322 generated by the developer or programmer that describes: (a) how the shared memory is to be partitioned between the programs; (b) the symbols for which the associated code/data is to be placed in shared memory; and (c) which partition each of these symbols is to be placed in. The symbol description 322 identifies all of the shared symbols in the programs and where the code/data associated with the shared symbols is to be stored in shared memory. In some cases, where one or more of the programs store non-shared or private code and/or data in the shared memory, the symbol description 322 also identifies the non-shared or private symbols associated with that data or code and where that data or code is to be stored in shared memory.

The linker driver 304 then generates a first linker script 324 to cause the linker 306 to allocate, in a first link stage, addresses in the shared memory to the identified shared symbols in the manner specified in the symbol description 322. Where the symbol description 322 identifies one or more non-shared symbols the linker driver 304 also generates one or more second linker scripts 325 to cause the linker 306 to allocate, in a second link stage, addresses in the shared memory to the identified non-shared symbols in the manner specified in the symbol description.

Figure 4:
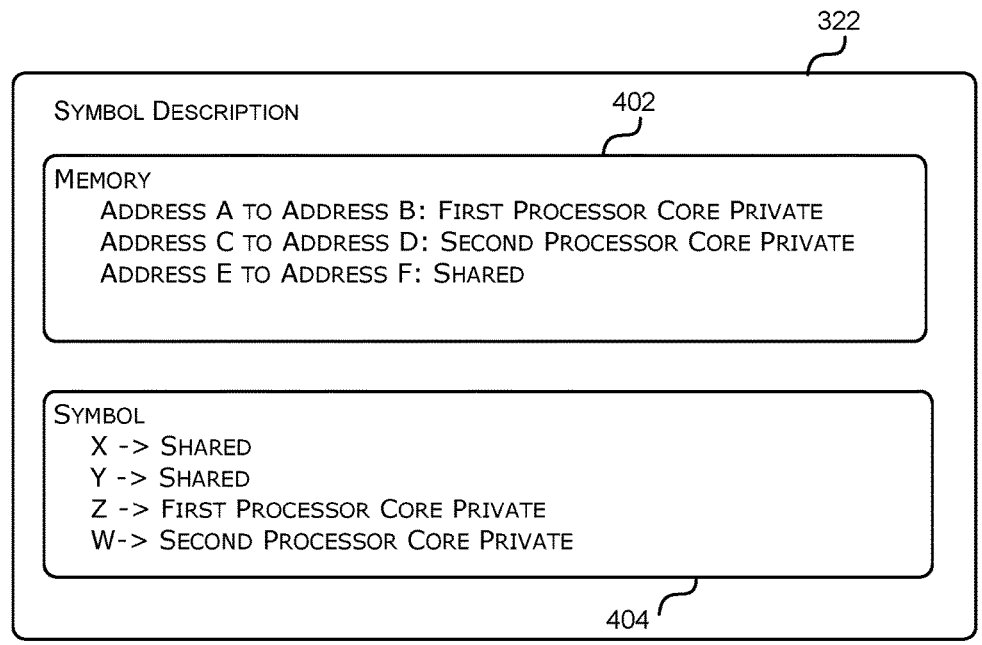
FIG. 4 is a schematic diagram of an example symbol description of FIG. 3.
Figure 4:
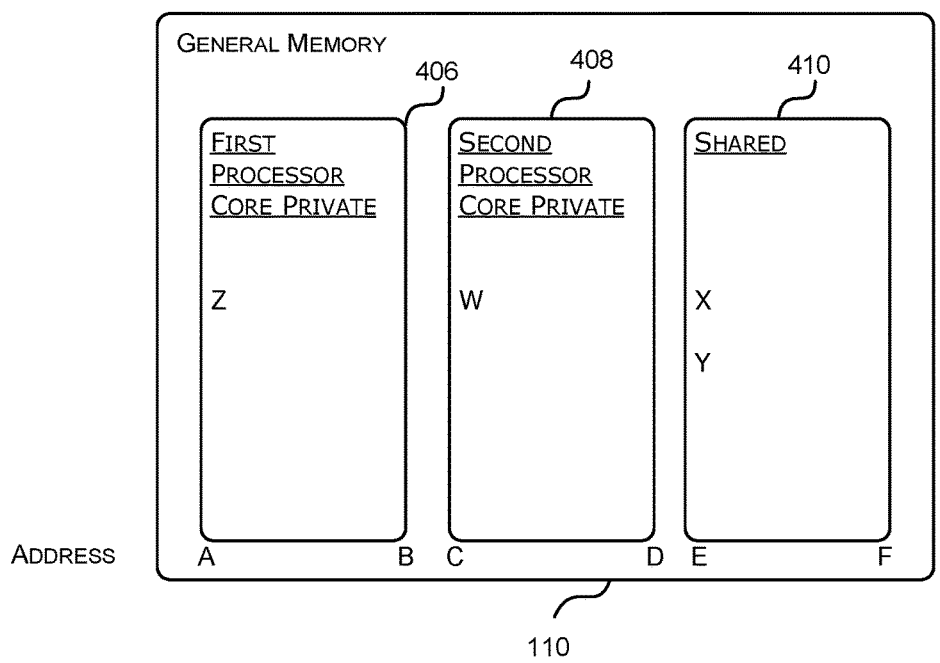

For example, as shown in FIG. 4, the symbol description 322 may comprise a memory part 402 and a symbol part 404. The memory part 402 indicates how the shared memory (e.g. general memory 110) is to be partitioned. In the example of FIG. 4 the memory part 402 indicates that the shared memory (e.g. general memory 110) is to be divided into three partitions 406, 408 and 410. The first partition 406 is used to store data/code associated with private or non-shared symbols for the first processor core (i.e. those symbols that can only be internally referenced within the first program), the second partition 408 is used to store data/code associated with private or non-shared symbols for the second processor core (i.e. those symbols that can only be internally referenced within the second program), and the third partition 410 is used to store data/code for shared symbols (i.e. those symbols that can be internally referenced by the program that created them or externally referenced by another program).

The symbol part 404 identifies those symbols in the first and second programs whose associated data/code is to be stored in the shared memory (e.g. general memory 110) and which partition of the shared memory (e.g. general memory 110) they should be stored in. In the example of FIG. 4 the symbol part 404 indicates the symbols "X" and "Y" are shared symbols and thus their associated code/data are to be stored in the shared partition 410; symbol "W" is a non-shared symbol for which the associated data/code is to be stored in the second processor core's private partition 408; and symbol "Z" is a non-shared symbol for which the associated data/code is to be stored in the first processor core's private partition 406.

In some cases the symbol description 322 may be implemented by a Python script, however, it will be evident to a person of skill in the art that this is an example only and the symbol description 322 may be implemented in any suitable format that can be understood by the linker driver 304.

The linker driver 304 uses the symbol description 322 to generate a first linker script 324 to cause the linker 306 to allocate shared memory addresses to the identified shared symbols according to the symbol description 322. Where the symbol description 322 also identifies at least one non-shared symbol then the linker driver 304 also generates at least one second linker script 325 to cause the linker 306 to allocate shared memory addresses to the identified non-shared symbols according to the symbol description 322. In other words the linker driver 304 extracts the requirements set out in the symbol description 322 and generates one or more linker scripts 324 and 325 representing those requirements in a format that the linker 306 understands.

In some cases (e.g. in a GNU Compiler Collection (GCC)-based system) the compiler 302 may be configured to place each symbol of the source code 310 or 312 in its own section in the object code 314 or 316. In these cases the linker 306 is not generally able to identify symbols by their symbol name. Therefore the linker scripts 324 and 325 cannot refer to the symbols identified in the symbol description 322 directly. Instead the linker scripts 324 and 325 refer to the associated section. Accordingly, in these cases the linker driver 304 may be configured to generate the linker scripts 324 and 325 by identifying, from the object code 314 and 316, the sections associated with each of the symbols identified in the symbol description 322 and then generating linker scripts that refer to those sections.

In other cases the linker 306 may be able to identify symbols by their symbol name. In these cases the linker 306 may be able to generate the linker scripts 324 and 325 from the symbol description 322 without access to the object code 314 and 316 for the first and second programs.

In cases where the linker driver 304 has access to the object code 314 and 316 for the first and second programs when generating the linker scripts 324 and 325 the linker driver 304 may be configured to confirm that the symbols referred to in the symbol description 322 actually exist in the object code 314 and 316 of one of the first and second programs before referring to the symbol in the linker scripts 324 and 325. This ensures that the linker scripts 324 and 325 do not erroneously refer to symbols that do not actually exist, and that the two programs do not both erroneously define a symbol identified as a shared symbol.

Correctly mapping the identified symbols to the shared memory can be quite complicated depending on the type of processor cores 102 and 104 because some processor cores 102 and 104 use multiple independent aliases to access the same physical memory. For example, some processer cores are configured to use a cached alias and/or a write-combined alias (e.g. to optimise access speed) to access the same part of shared memory. Therefore it is important that different symbols (executable instructions and data elements) are not allocated to the same physical memory accidentally via two different aliases.

By using the linker driver 304 to generate linker scripts 324 and 325 that cause the linker 306 to allocate shared memory addresses to symbols of the first and second programs, the programmer can simply identify the symbols which are placed in shared memory and which partition they are to be stored in and leave the linker driver 304 to identify the appropriate mappings between the symbols and addresses of the shared memory.

In some examples, once the linker driver 304 has generated the linker scripts 324 and 325, the linker driver 304 causes the linker 306 to link the object code 314 and 316 for the first and second programs in a first link stage using the first linker script 324. This causes the linker 306 to allocate addresses in shared memory to each shared symbol identified in the symbol description 322 in the manner set forth in the symbol description 322, and generate a fully linked, via the allocated memory address, executable file that comprises metadata that identifies the shared symbols and the shared memory addresses allocated thereto, and executable code and initialised data associated with the identified shared symbols.

As is known to those of skill in the art a symbol may be associated with code, initialised data, or uninitialised data. Initialised data is set to a definite known value prior to running the program, whereas uninitialised data is data that is declared but is not set to a definite known value prior to running the program. The shared symbols may refer to any combination of code, initialised data, or uninitialised data therefore the executable file generated in the first link stage may or may not contain executable code or initialised data. For example, if none of the shared symbols refer to code or initialised data (i.e. the shared symbols all refer to uninitialised data) then the executable file would contain the metadata, but not executable code and initialised data.

In some examples, the executable file generated in the first link stage is output as the library. In these examples the library may be in the format of an ELF file. In other examples, such as where the executable file does not comprise executable code or initialised data, the shared memory addresses allocated to the shared symbols may be extracted from the executable file and stored in another file or format which may be output as the library.

In either case, the library may be implemented by a single file or a set of files. For example, in some cases there may be a single library file that comprises all of the memory allocations (and, potentially, executable code and initialised data) for all identified shared symbols. In other cases there may be multiple library files. For example, there may be one library file for each type of shared memory. In particular, there may be one library file for the memory address allocations (and potentially executable code and initialised data) related to the shared symbols to be stored in the general memory 110 and one library file for the memory address allocations (and potentially executable code and initialised data) related to the shared symbols to be stored in the external memory 112. It will be evident that these are examples only and the memory address allocations (and potentially executable code and initialised data) for the identified symbols may be stored in one, or more than one, library file.

Once the linker 306 has completed the first link stage and output the library 326 the linker driver 304 causes the linker 306 to generate, in a second link stage, an executable file 328 and 330 for each program that comprises executable code and initialised data for the non-shared code and data of that program which is linked to the shared code and data via the memory addresses in the library 326. Where one or more of the programs stores non-shared or private code and/or data in the shared memory the linker script used in the second link stage may be the second linker script(s) 325 generated by the linker driver 304. In other cases the linker script used in the second link stage may be a default or another linker script generated by the linker driver 304.

This causes the linker 306 to generate executable files 328 and 330 for each of the first and second programs that allows the two programs to access code/data placed in the shared memory by the other program. Specifically the linker 306 generates executable files in which (i) the two programs agree as to where the shared code/data will be placed in the shared memory; and (ii) the two programs will not use the same portion of shared memory 110 or 112 for different purposes.

Although FIG. 3 shows a single linker 306 that generates the executable files 328 and 330 for the first and second programs, in other examples separate linkers may be used to generate the executable files for the first and second programs. For example, a first linker may be used to generate the executable file 328 for the first program from the object code 314 for the first program, the metadata 318 for the first program, a second linker script 325 and the library 326; and a second separate linker may be used to generate the executable file 330 for the second program from the object code 316 for the second program, the metadata 320 for the second program, a second linker script 325 and the library 326.

The loader 308 is a software program or tool that is configured to load executable code and initialised data into memory. In the examples described herein the loader 308 is configured to load the executable code and initialised data generated in the first and second link stages (e.g. the shared executable code and initialised data (from the library); and the non-shared executable code and initialised data (from the executable files)). In some cases the executable code and initialised data generated in the first and second link stages are maintained in separate files (e.g. the library and executable files respectively). In these cases the loader 308 receives the executable files 328 and 330 and the library 326 generated by the linker 306 and loads the executable code and initialised data from the executable files 328 and 330 and the library 326 into the memory 106, 108, 110 and 112 of the embedded system 100.

In other cases the executable code and initialised data generated in the first link stage (i.e. the shared executable code and initialised data) may be incorporated into one or more of the executable files during the second link stage. In these cases only the executable files (wherein at least one includes the executable code and data from the library) are provided to the loader 308. In one example the full contents of the library 326 may be incorporated into one of the executable files during the second link stage while the other executable files only use the addresses of the library. Then the loading of the executable code and initialised data from that particular executable file would cause the executable code and initialised data (originally in the library) to be loaded into shared memory. In other examples, the full contents of the library 326 may be incorporated into all of the executable files during the second link stage and the loader 308 may be configured to only load the shared executable code and initialised data (originally in the library) into the shared memory once.

As described above, in some cases the executable files 328 and 330 and/or the library 326 (e.g. when in an executable linkable format (ELF) file)) may comprise metadata that indicates, amongst other things, the memory addresses allocated to the symbols and/or where in the memory of the embedded system the parts or sections of the executable files 328 and 330 and/or library 326 should be loaded. For example, the metadata may specify that the executable code is to be placed at a certain address and the initialised data is to be placed at another address. In other cases the loader 308 may be run on the embedded system (e.g. embedded system 100) itself and the boot image of the embedded system may include metadata that indicates where in the memory the executable code and initialised data of the executable files 328 and 330 and library 326 should be loaded.

In some cases, prior to providing the executable files 328 and 330 (and/or the library 326) to the loader 308 the executable files 328 and 330 and the library 326 may be post-processed to create a simpler loader image file that only comprises the executable code and initialised data, and minimal instructions to enable a simple loader 308 (e.g. an embedded bootloader application) to store the executable code and initialised data into memory. In these cases, a single loader image file may be generated for each executable file and the library (if not incorporated into at least one executable file), or a single loader image file may be generated for each program based on the executable file for that program and the library so that one or more of the loader image files comprises the executable code and initialised data from the library.

Figure 5:
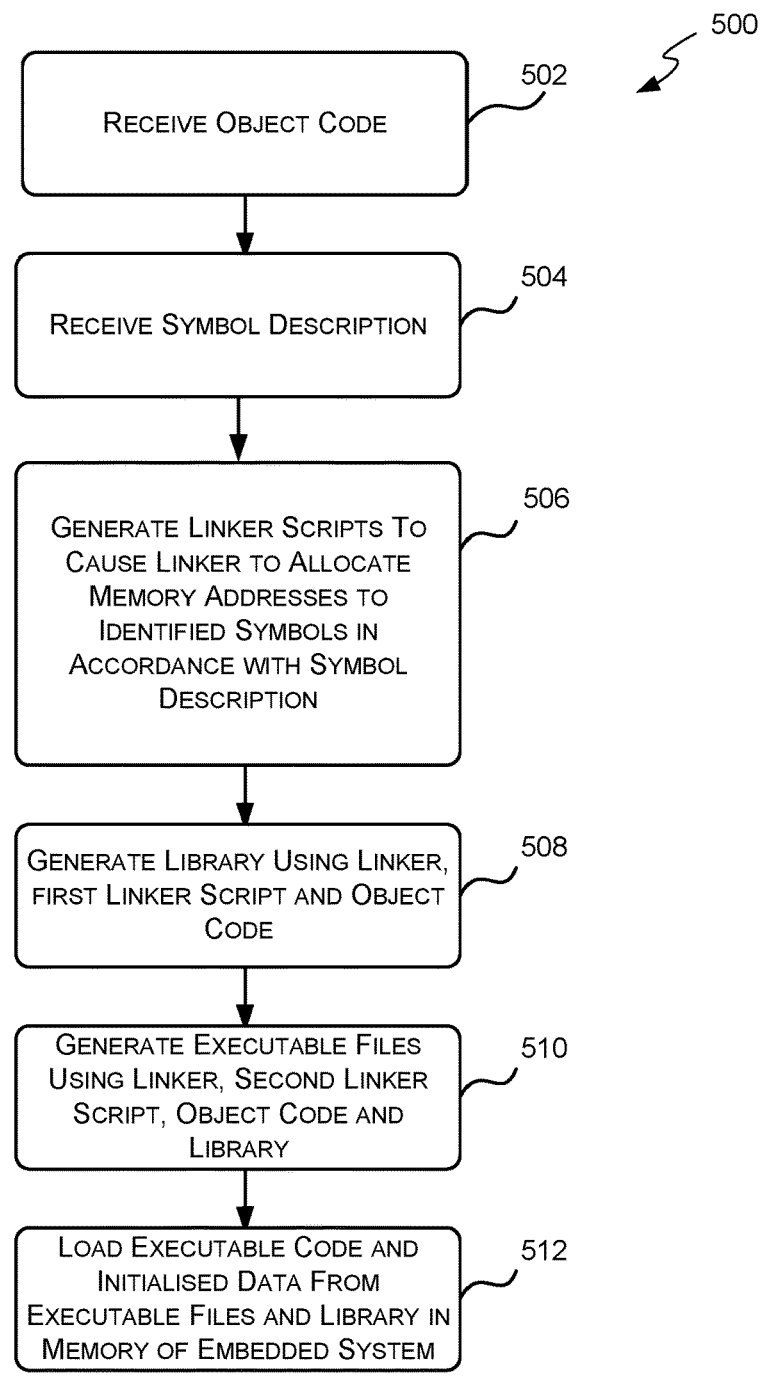
FIG. 5 is a flow diagram of an example method for generating executable code and initialised data for two different programs run on two different processor cores that share data and/or code via a shared memory.

Reference is now made to FIG. 5 which illustrates a method 500 for generating executable code and initialised data for two or more independent computer programs to be run on separate processor cores of an embedded system wherein the programs share code/data via shared memory of the embedded system by symbolically referring to data/code in another program.

The method 500 begins at block 502 where the linker driver 304 receives object code 314 and 316 (and/or metadata 318 and 320) for each of the independent computer programs. The computer programs are designed to share data/code via shared memory (e.g. memory 110 and/or 112) of the embedded system by symbolically referring to data/code in another program. In other words the object code for each computer program comprises one or more instructions that refers to a symbol defined in another of the computer programs (i.e. the object code for each computer program comprises at least one external symbolic reference). For example, a first computer program may include a block of data referred to symbolically as "X" and a second program may symbolically refer to that data using the symbol "X".

Once the object code 314 and 316 for the computer programs have been received the method 500 proceeds to block 504.

At block 504, the linker driver 304 receives a symbol description 322 that identifies (i) symbols (shared symbols and optionally non-shared symbols) defined in the object code 314 and 316 for which the associated data/code is to be stored in the shared memory of the embedded system; and (ii) locations in the shared memory of the embedded system where the associated data/code for the identified symbols are to be stored. As described above with reference to FIGS. 3 and 4, the symbol description 322, may, for example, comprise a memory part 402 which identifies how the shared memory should be partitioned between the programs/processor cores and a symbol part 404 which identifies which symbols are to have their associated data/code stored in the shared memory and in which partition. For example, the memory part 402 may specify that each shared memory is to be partitioned into a private partition for each program/core and a shared partition where shared symbols will be stored and accessible to all programs/cores; and the symbol part 404 may identify "X" as being a symbol whose associated data/text is to be stored in the shared memory in the shared partition. A symbol to be stored in the shared partition is a shared symbol. Once the symbol description 322 has been received the method 500 proceeds to block 506.

It will be evident to a person of skill in the art that blocks 502 and 504 may be executed in the reverse order (e.g. block 504 may be completed before block 502) or they may be executed concurrently.

At block 506, the linker driver 304 generates, based on the symbol description 322 received in block 504, a first linker script 324 to cause a linker 306 to allocate addresses in the shared memory to the shared symbols identified in the symbol description according to the memory locations identified in the symbol description 322. Where one or more of the computer programs stores non-shared or private code and/or data in the shared memory such that the symbol description identifies one or more non-shared symbols the linker driver 304 also generates at least one second linker script 325 to cause a linker 306 to allocate addresses in the shared memory to the identified non-shared symbols according to the locations identified in the symbol description 322.

As described above, in some cases the compiler 302 may be configured to create a section in the object code for each symbol in the source code and the linker 306 may only understand references to sections as opposed to symbols. In these cases generating the linker scripts 324 and 325 may include identifying the sections of the object code corresponding to the symbols identified in the symbol description 322 and generating the linker scripts 324 and 325 so that the linker scripts 324 and 325 refer to the identified sections.

As described above, in some cases, generating the linker script 324 may also include confirming that each of the symbols identified in the symbol description 322 is defined in the object code for one of the computer programs and only including information related to an identified symbol in the linker scripts 324 and 325 if the symbol is confirmed to be defined in the object code for one of the programs. Once the linker scripts 324 and 325 have been generated the method 500 proceeds to block 508.

At block 508, the linker driver 304 implements a first link stage of the object code 314 and 316. In the first link stage the linker driver 304 causes the linker 306 to generate, based on the first linker script 324, a library identifying the shared symbols (identified in the symbol description 322) and the shared memory addresses allocated thereto.

In some examples the first linker script 324 generated at block 506 causes the linker 306 to allocate addresses in the shared memory to the identified shared symbols in accordance with the symbol description 322 received in block 504, and generate an executable file comprising metadata identifying the shared symbols and the shared memory addresses allocated thereto. Where the shared symbols are associated with code and/or initialised data then the linker may also generate fully linked, via the allocated memory address, executable code and initialised data for the shared symbols. In some cases the executable file is output as the library.

As described above, the library 326 may be stored in one or more library files. For example, the allocated shared memory addresses (and, in some cases, executable code and initialised data) for shared symbols to be stored in a first shared memory (e.g. general memory 110) may be stored in one library file and the allocated shared memory addresses (and, in some cases, executable code and initialised data) for shared symbols to be stored in a second shared memory (e.g. external memory 112) may be stored in another library file. Once the library 326 has been generated the method 500 proceeds to block 510.

At block 510, the linker driver 304 implements a second link stage of the object code 314 and 316. In the second link stage the linker driver 304 causes the linker 306 to generate an executable file for each program comprising executable code and initialised data for non-shared code/data of that program using the second linker script 325 to allocate shared memory addresses to non-shared symbols stored in shared memory, and using the library 326 generated at block 508 to link to the shared code and/or data. In particular, the linker 306 generates executable code and data from the object code related to the non-shared code and data in a standard manner except the addresses for the symbols in the library are taken from the library.

For example, the linker 306 may generate the executable files by allocating memory to all the non-shared or private symbols in the object code, allocating corresponding memory addresses to each non-shared or private symbol and then inserting those addresses into the "holes" of the object code that the metadata indicates should contain the address of a symbol. The addresses for the shared symbols in the library are taken from the library file rather than calculated by the linker allowing those addresses to be fixed and agreed in all programs that link against that library.

This ensures that all of the programs know and agree where the shared data/code is and know how to access it. For example, if a first program includes a block of data referred to using symbol "X" and a second program wants to access the data referred to as "X", both programs will know that "X" is located at address 0x1004, for example. Once the executable files for the programs have been generated the method 500 proceeds to block 512.

At block 512, a loader 308 loads the executable code and initialised data generated in the first and second link stages (e.g. the executable code and initialised data in the executable files 328 and 330 and the library 326) into the memory of the embedded system. Example methods for loading the executable code and initialised data generated in the first and second link stages into the memory of the embedded system were described in detail above with respect to FIG. 3. Since the executable code and initialised data loaded into the memory of the embedded system includes information that allows each program to correctly identify the location of shared data/code in the shared memory the programs can share data/code in an efficient manner.

Figure 6:
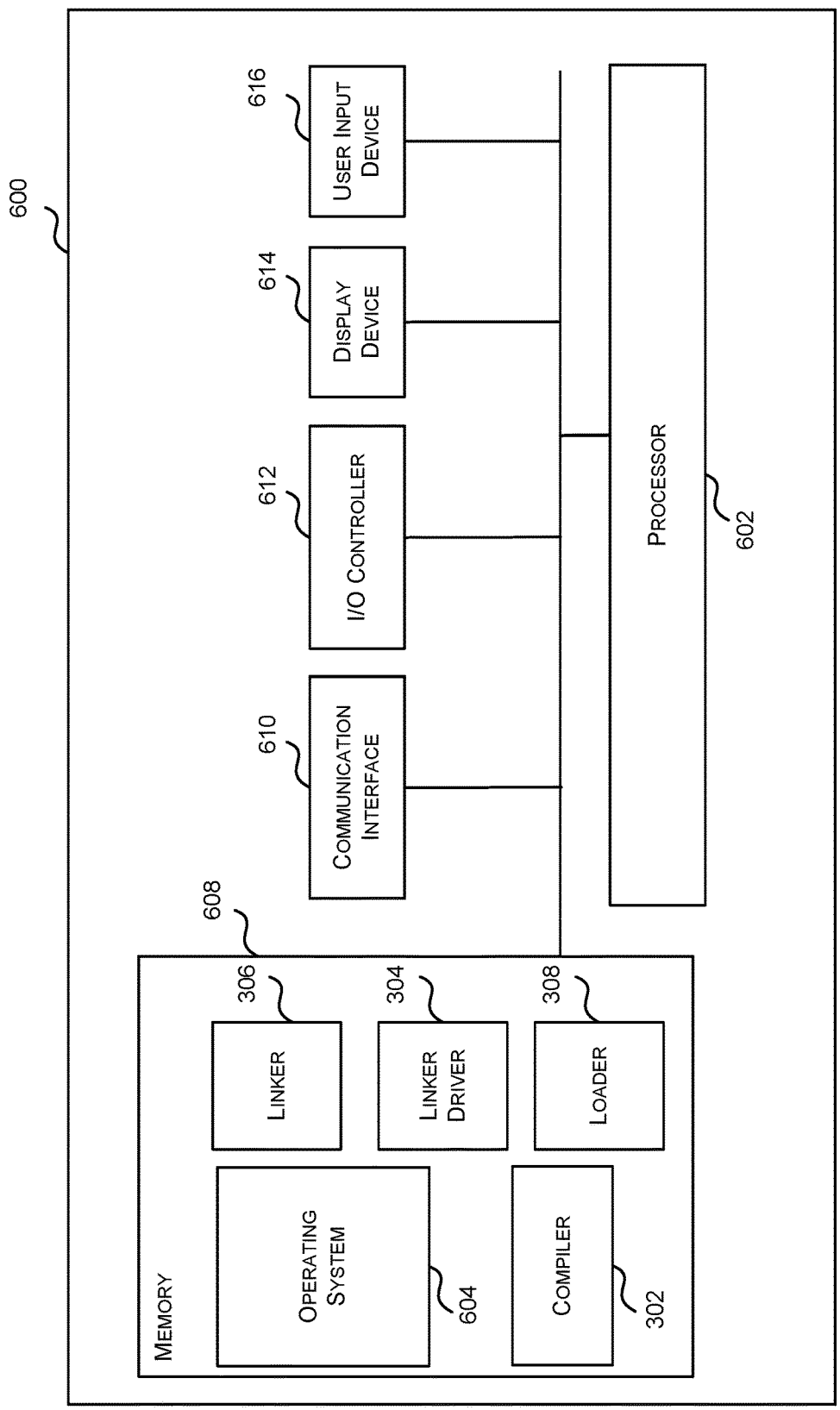
FIG. 6 is a block diagram of an example computing-based device.

FIG. 6 illustrates various components of an exemplary computing-based device 600 which may be implemented as any form of a computing and/or electronic device, and in which embodiments of the systems and methods described herein may be implemented.

Computing-based device 600 comprises one or more processors 602 which may be microprocessors, controllers or any other suitable type of processors for processing computer executable instructions to control the operation of the device in order to generate executable files for multiple programs to be run on separate processor cores of an embedded system. In some examples, for example where a system on a chip architecture is used, the processors 602 may include one or more fixed function blocks (also referred to as accelerators) which implement a part of the method 500 of FIG. 5 in hardware (rather than software or firmware). Platform software comprising an operating system 604 or any other suitable platform software may be provided at the computing-based device to enable application software, such as a complier 302, linker driver 304, linker 306 and loader 308 to be executed on the device.

The computer executable instructions may be provided using any computer-readable media that is accessible by computing-based device 600. Computer-readable media may include, for example, computer storage media such as memory 608 and communications media. Computer storage media (i.e. non-transitory machine readable media), such as memory 608, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 608) is shown within the computing-based device 600 it will be appreciated that the storage may be distributed or located remotely and accessed via a network or other communication link (e.g. using communication interface 610).

The computing-based device 600 also comprises an input/output controller 612 arranged to output display information to a display device 614 which may be separate from or integral to the computing-based device 600. The display information may provide a graphical user interface. The input/output controller 612 is also arranged to receive and process input from one or more devices, such as a user input device 616 (e.g. a mouse or a keyboard). This user input may be used to initiate the linking process. In an embodiment the display device 614 may also act as the user input device 616 if it is a touch sensitive display device. The input/output controller 612 may also output data to devices other than the display device, e.g. a locally connected printing device (not shown in FIG. 6).

The system 300 of FIG. 3 are shown as comprising a number of functional/software blocks. This is schematic only and is not intended to define a strict division between different logic elements of such entities. Each functional/ software block may be provided in any suitable manner. It is to be understood that intermediate values described herein as being formed by a particular functional/software block need not be physically generated by that particular functional/software block at any point and may merely represent logical values which conveniently describe the processing performed by the software blocks between its input and output.

The embedded system 100 described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realise that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an embedded system 100 described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an embedded system 100 will now be described with respect to FIG. 7.

Figure 7:
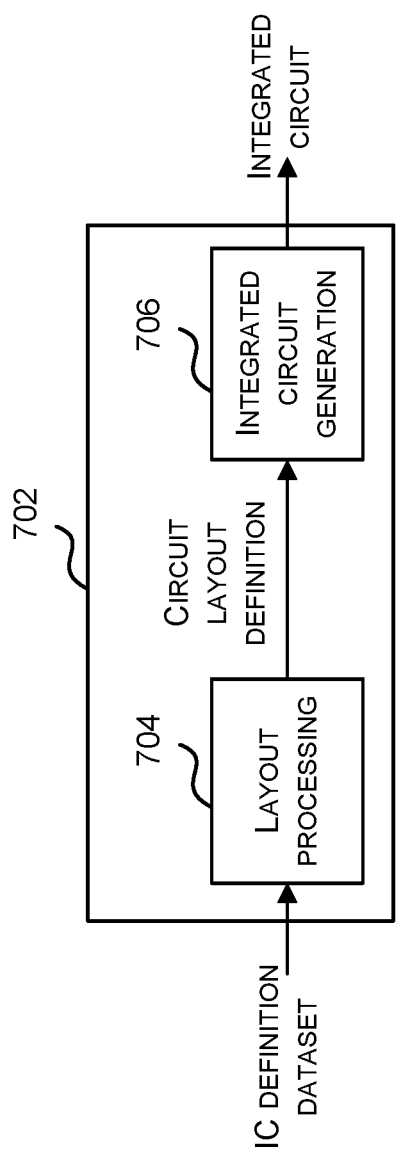
FIG. 7 is a block diagram of an example integrated circuit manufacturing system.

FIG. 7 shows an example of an integrated circuit (IC) manufacturing system 702 which comprises a layout processing system 704 and an integrated circuit generation system 706. The IC manufacturing system 702 is configured to receive an IC definition dataset (e.g. defining an embedded system 100 as described in any of the examples herein), process the IC definition dataset, and generate an IC according to the IC definition dataset (e.g. which embodies an embedded system 100 as described in any of the examples herein). The processing of the IC definition dataset configures the IC manufacturing system 702 to manufacture an integrated circuit embodying an embedded system as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 703 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an embedded system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Aspects of the invention are disclosed in the following numbered clauses:

Clause 1. A computer-implemented method (500) of storing a plurality of computer programs in memory of an embedded system comprising a plurality of processor cores, each of the plurality of computer programs to be run on a different processor core of the plurality of processor cores, the method (500) comprising: receiving object code for each of the plurality of computer programs, the object code for each computer program comprising one or more instructions that refers to a shared symbol defined in another of the plurality of computer programs (502); receiving a symbol description that identifies: (i) shared symbols defined in the plurality of computer programs for which shared data or code associated with the shared symbol is to be stored in shared memory of the embedded system, and (ii) a location in the shared memory of the embedded system where the shared data or code associated with each of the identified shared symbols is to be stored (504); generating, based on the symbol description, a first linker script to cause a linker to allocate memory addresses to the shared symbols identified in the symbol description according to the locations identified in the symbol description (506); causing a linker, in a first link stage, to generate, based on the first linker script and the object code for the plurality of computer programs, a library comprising shared memory addresses allocated to the shared symbols identified in the symbol description according to the locations identified in the symbol description (508); causing a linker, in a second link stage, to generate, based on the object code for each of the plurality of computer programs and the library, an executable file for each of the plurality of computer programs comprising executable code for the non-shared code and data of the computer program that is linked to the shared code and/or data via the shared memory addresses in the library (510); and loading the executable code from the executable files into the memory of the embedded system (512).

Clause 2. The method (500) of clause 1, wherein the symbol description comprises a memory part and a symbol part, the memory part indicates that the shared memory is to be partitioned into a plurality of partitions, and the symbol part indicates the symbols for which data or code associated with the symbol is to be stored in the shared memory and which of the plurality of partitions the associated data or code is to be stored.

Clause 3. The method (500) of clause 1 or clause 2, wherein the object code for each computer program comprises a section for each symbol referred to therein, and generating the first linker script comprises identifying a section in the object code for the plurality of computer programs for each shared symbol identified in the symbol description and referring to the identified sections in the first linker script.

Clause 4. The method (500) of any of clauses 1 to 3, wherein generating the first linker script comprises verifying that each of the symbols identified in the symbol description is defined in the object code of at least one computer program, and only referring to a symbol identified in the symbol description in the first linker script if it is defined in the object code of exactly one computer program.

Clause 5. The method (500) of any preceding clause, wherein the library is a an executable file that comprises metadata that identifies the shared symbols and the shared memory addresses allocated to the shared symbols.

Clause 6. The method (500) of any preceding clause, wherein the library further comprises fully linked executable code and/or initialised data associated with the shared symbols identified in the symbol description; and the method further comprises loading the executable code and/or initialised data from the library into the shared memory of the embedded system.

Clause 7. The method (500) of any preceding clause, wherein one or more of the executable files further comprises initialised data; and the method further comprises loading the initialised data from the one or more executable files into the memory of the embedded system.

Clause 8. The method (500) of any preceding clause, wherein the symbol description further identifies (i) non-shared symbols defined in the plurality of computer programs for which non-shared data or code associated with the non-shared symbol is to be stored in shared memory of the embedded system, and (ii) a location in the shared memory of the embedded system where the data or code associated with each of the identified non-shared symbols is to be stored; and the method further comprises generating one or more second linker scripts to cause the linker to allocate memory addresses to the non-shared symbols identified in the symbol description according to the locations identified in the symbol description; and the one or more second linker scripts are used in the second link stage to cause the linker to allocate shared memory addresses to the non-shared symbols identified in the symbol description according to the locations identified in the symbol description.

Clause 9. The method (500) of any preceding clause, wherein execution of the executable code loaded into the memory by the plurality of processor cores of the embedded system causes a first processor core of the plurality of processor cores to write data to a location in the shared memory and a second processor to access that data in that location of the shared memory.

Clause 10. The method (500) of clause 9, further comprising executing the executable code loaded into the memory using the plurality of processor cores which causes a first processor core of the plurality of processor cores to write data to a location in the shared memory and a second processor to access that data in that location of the shared memory.

Clause 11. A system (300) to store a plurality of computer programs in memory of an embedded system (100) comprising a plurality of processor cores (102, 104), each of the plurality of computer programs to be run on a different processor core (102, 104) of the plurality of processor cores (102, 104), the system (300) comprising: a linker (306); a linker driver (304) configured to: receive object code (314, 316) for each of the plurality of computer programs, the object code (314, 316) for each computer program comprising one or more instructions (210, 216) that refers to a shared symbol defined in another of the plurality of computer programs; receive a symbol description (322) that identifies: (i) shared symbols defined in the plurality of computer programs in which associated shared code or data is to be stored in shared memory of the embedded system (100), and (ii) locations in the shared memory of the embedded system (100) where the shared data or code associated with the identified shared symbols is to be stored; generate, based on the symbol description (322), a first linker script (324) to cause the linker (306) to allocate memory addresses to the shared symbols identified in the symbol description (322) according to the locations identified in the symbol description (322); cause the linker (306) to generate in a first link stage, based on the first linker script (324) and the object code (314, 316) for the plurality of computer programs, a library (326) comprising shared memory addresses allocated to the shared symbols identified in the symbol description (322) according to the locations identified in the symbol description (322); and cause the linker (306) to generate in a second link stage, based on the object code (314, 316) for each of the plurality of computer programs and the library (326), an executable file (328, 330) for each of the plurality of computer programs comprising executable code for the non-shared code and data of the computer program that is linked to the shared code and/or data via the shared memory address in the library; and a loader (308) configured to load the executable code of the executable files (328, 330) into memory (106, 108, 110, 112) of the embedded system (100).

Clause 12. The system (300) of clause 11, wherein the symbol description (322) comprises a memory part (402) and a symbol part (404), the memory part (402) indicates that the shared memory is to be partitioned into a plurality of partitions, and the symbol part (404) indicates the symbols for which data or code associated with the symbol is to be stored in the shared memory and which of the plurality of partitions the associated data or code is to be stored.

Clause 13. The system (300) of clause 11 or clause 12, wherein the object code (314, 316) for each computer program comprises a section for each symbol referred to therein, and the linker driver (304) is configured to generate the linker script (324) by identifying a section in the object code for the plurality of computer programs for each shared symbol identified in the symbol description (322) and referring to the identified sections in the linker script (324).

Clause 14. The system (300) of any of clauses 11 to 13, wherein the linker driver (304) is configured to generate the linker script (324) by verifying that each symbol identified in the symbol description (322) is defined in the object code (314, 316) of at least one computer program, and only referring to a shared symbol identified in the symbol description (322) in the first linker script (324) if it is defined in the object code (314, 316) of exactly one computer program.

Clause 15. The system (300) of any of clauses 11 to 14, wherein the system (300) further comprises the embedded system (100) and execution of the executable code loaded into the memory by the plurality of processor cores (102, 104) of the embedded system (100) causes a first processor core (102) of the plurality of processor cores to write data to a location in the shared memory (110, 112) and a second processor core (104) of the plurality of processor cores to access that data in that location of the shared memory (110, 112).

Clause 16. The system (300) of any of clauses 11 to 15, wherein the library (326) is an executable file that comprises metadata that identifies the shared symbols and the shared memory addresses allocated to the shared symbols.

Clause 17. The system (300) of any of clauses 11 to 16, wherein the library (326) further comprises fully linked executable code and/or initialised data associated with the shared symbols identified in the symbol description; and the loader (308) is further configured to load the executable code and/or initialised data from the library into the shared memory (110, 112) of the embedded system.

Clause 18. The system (300) of any of clauses 11 to 17, wherein one or more of the executable files comprises initialised data; and the loader (308) is further configured to load the initialised data from the one or more executable files into the memory of the embedded system.

Clause 19. The system (300) of any of clauses 11 to 18, wherein the symbol description further identifies (i) non-shared symbols defined in the plurality of computer programs for which non-shared data or code associated with the non-shared symbol is to be stored in shared memory of the embedded system, and (ii) a location in the shared memory of the embedded system where the data or code associated with each of the identified non-shared symbols is to be stored; and the linker driver (304) is further configured to: generate one or more second linker scripts (325) to cause the linker (306) to allocate shared memory addresses to the non-shared symbols identified in the symbol description (322) according to the locations identified in the symbol description (322); and use the one or more second linker scripts (325) in the second link stage to cause the linker (306) to allocate shared memory addresses to the non-shared symbols identified in the symbol description (322) according to the locations identified in the symbol description (322).

Clause 20. The system (300) of any of clauses 11 to 19, wherein the embedded system (100) is a radio processing unit.

Clause 21. An embedded system (100) comprising a plurality of processor cores (102, 104) each configured to execute a separate computer program, the embedded system (100) obtained by performing the method (500) of any of clauses 1 to 8 to load executable code (328, 330) representing each of the programs into a memory (106, 108, 110, 112) of the embedded system (100).

Clause 22. Computer readable code configured to perform the steps of the method (500) of any of clauses 1 to 8 when the computer readable code is run on a computer.

Clause 23. A computer readable storage medium having encoded thereon the computer readable code of clause 22.

What is claimed is:

1. A computer-implemented method of storing a plurality of computer programs in memory of an embedded system comprising a plurality of processor cores, each of the plurality of computer programs to be run on a different processor core of the plurality of processor cores, the method comprising:

receiving object code for each of the plurality of computer programs, the object code for each computer program comprising one or more instructions that refers to a shared symbol defined in another of the plurality of computer programs;

receiving a symbol description that identifies: (i) shared symbols defined in the plurality of computer programs for which shared data or code associated with the shared symbol is to be stored in shared memory of the embedded system, and (ii) a location in the shared memory of the embedded system where the shared data or code associated with each of the identified shared symbols is to be stored;

generating, based on the symbol description, a first linker script to cause a linker to allocate memory addresses to the shared symbols identified in the symbol description according to the locations identified in the symbol description;

causing a linker, in a first link stage, to generate, based on the first linker script and the object code for the plurality of computer programs, a library comprising shared memory addresses allocated to the shared symbols identified in the symbol description according to the locations identified in the symbol description;

causing a linker, in a second link stage, to generate, based on the object code for each of the plurality of computer programs and the library, an executable file for each of the plurality of computer programs comprising executable code for the non-shared code and data of the computer program that is linked to the shared code and/or data via the shared memory addresses in the library; and loading the executable code from the executable files into the memory of the embedded system.

2. The method of claim 1, wherein the symbol description comprises a memory part and a symbol part, the memory part indicates that the shared memory is to be partitioned into a plurality of partitions, and the symbol part indicates the symbols for which data or code associated with the symbol is to be stored in the shared memory and which of the plurality of partitions the associated data or code is to be stored.

3. The method of claim 1, wherein the object code for each computer program comprises a section for each symbol referred to therein, and generating the first linker script comprises identifying a section in the object code for the plurality of computer programs for each shared symbol identified in the symbol description and referring to the identified sections in the first linker script.

4. The method of claim 1, wherein generating the first linker script comprises verifying that each of the symbols identified in the symbol description is defined in the object code of at least one computer program, and only referring to a symbol identified in the symbol description in the first linker script if it is defined in the object code of exactly one computer program.

5. The method of claim 1, wherein the library is a an executable file that comprises metadata that identifies the shared symbols and the shared memory addresses allocated to the shared symbols.

6. The method of claim 1, wherein the library further comprises fully linked executable code and/or initialised data associated with the shared symbols identified in the symbol description; and the method further comprises loading the executable code and/or initialised data from the library into the shared memory of the embedded system.

7. The method of claim 1, wherein the symbol description further identifies (i) non-shared symbols defined in the plurality of computer programs for which non-shared data or code associated with the non-shared symbol is to be stored in shared memory of the embedded system, and (ii) a location in the shared memory of the embedded system where the data or code associated with each of the identified non-shared symbols is to be stored; and the method further comprises generating one or more second linker scripts to cause the linker to allocate memory addresses to the non-shared symbols identified in the symbol description according to the locations identified in the symbol description;

and the one or more second linker scripts are used in the second link stage to cause the linker to allocate shared memory addresses to the non-shared symbols identified in the symbol description according to the locations identified in the symbol description.

8. The method of claim 1, wherein execution of the executable code loaded into the memory by the plurality of processor cores of the embedded system causes a first processor core of the plurality of processor cores to write data to a location in the shared memory and a second processor to access that data in that location of the shared memory.

9. The method of claim 8, further comprising executing the executable code loaded into the memory using the plurality of processor cores which causes a first processor core of the plurality of processor cores to write data to a location in the shared memory and a second processor to access that data in that location of the shared memory.

10. A system to store a plurality of computer programs in memory of an embedded system comprising a plurality of processor cores, each of the plurality of computer programs to be run on a different processor core of the plurality of processor cores, the system comprising:

a linker;

a linker driver configured to:

receive object code for each of the plurality of computer programs, the object code for each computer program comprising one or more instructions that refers to a shared symbol defined in another of the plurality of computer programs;

receive a symbol description that identifies: (i) shared symbols defined in the plurality of computer programs in which associated shared code or data is to be stored in shared memory of the embedded system, and (ii) locations in the shared memory of the embedded system where the shared data or code associated with the identified shared symbols is to be stored;

generate, based on the symbol description, a first linker script to cause the linker to allocate memory addresses to the shared symbols identified in the symbol description according to the locations identified in the symbol description;

cause the linker to generate in a first link stage, based on the first linker script and the object code for the plurality of computer programs, a library comprising shared memory addresses allocated to the shared symbols identified in the symbol description according to the locations identified in the symbol description; and cause the linker to generate in a second link stage, based on the object code for each of the plurality of computer programs and the library, an executable file for each of the plurality of computer programs comprising executable code for the non-shared code and data of the computer program that is linked to the shared code and/or data via the shared memory address in the library; and a loader configured to load the executable code of the executable files into memory of the embedded system.

11. The system of claim 10, wherein the symbol description comprises a memory part and a symbol part, the memory part indicates that the shared memory is to be partitioned into a plurality of partitions, and the symbol part indicates the symbols for which data or code associated with the symbol is to be stored in the shared memory and which of the plurality of partitions the associated data or code is to be stored.

12. The system of claim 10, wherein the object code for each computer program comprises a section for each symbol referred to therein, and the linker driver is configured to generate the linker script by identifying a section in the object code for the plurality of computer programs for each shared symbol identified in the symbol description and referring to the identified sections in the linker script.

13. The system of claim 10, wherein the linker driver is configured to generate the linker script by verifying that each symbol identified in the symbol description is defined in the object code of at least one computer program, and only referring to a shared symbol identified in the symbol description in the first linker script if it is defined in the object code of exactly one computer program.

14. The system of claim 10, wherein the system further comprises the embedded system and execution of the executable code loaded into the memory by the plurality of processor cores of the embedded system causes a first processor core of the plurality of processor cores to write data to a location in the shared memory and a second processor core of the plurality of processor cores to access that data in that location of the shared memory.

15. The system of claim 10, wherein the library is an executable file that comprises metadata that identifies the shared symbols and the shared memory addresses allocated to the shared symbols.

16. The system of claim 10, wherein the library further comprises fully linked executable code and/or initialised data associated with the shared symbols identified in the symbol description; and the loader is further configured to load the executable code and/or initialised data from the library into the shared memory of the embedded system.

17. The system of claim 10, wherein the symbol description further identifies (i) non-shared symbols defined in the plurality of computer programs for which non-shared data or code associated with the non-shared symbol is to be stored in shared memory of the embedded system, and (ii) a location in the shared memory of the embedded system where the data or code associated with each of the identified non-shared symbols is to be stored; and the linker driver is further configured to:
generate one or more second linker scripts to cause the linker to allocate shared memory addresses to the non-shared symbols identified in the symbol description according to the locations identified in the symbol description; and
use the one or more second linker scripts in the second link stage to cause the linker to allocate shared memory addresses to the non-shared symbols identified in the symbol description according to the locations identified in the symbol description.

18. An embedded system obtained by storing a plurality of computer programs in a memory of the embedded system as set forth in claim 1, the embedded system comprising a plurality of processor cores each configured to execute a separate computer program stored in said memory.

19. A non-transitory computer readable storage medium having stored thereon computer readable code configured to, when the computer readable code is run on a computer, perform a computer-implemented method of storing a plurality of computer programs in memory of an embedded system comprising a plurality of processor cores, each of the plurality of computer programs to be run on a different processor core of the plurality of processor cores, the method comprising:

receiving object code for each of the plurality of computer programs, the object code for each computer program comprising one or more instructions that refers to a shared symbol defined in another of the plurality of computer programs;

receiving a symbol description that identifies: (i) shared symbols defined in the plurality of computer programs for which shared data or code associated with the shared symbol is to be stored in shared memory of the embedded system, and (ii) a location in the shared memory of the embedded system where the shared data or code associated with each of the identified shared symbols is to be stored;

generating, based on the symbol description, a first linker script to cause a linker to allocate memory addresses to the shared symbols identified in the symbol description according to the locations identified in the symbol description;

causing a linker, in a first link stage, to generate, based on the first linker script and the object code for the plurality of computer programs, a library comprising shared memory addresses allocated to the shared symbols identified in the symbol description according to the locations identified in the symbol description;

causing a linker, in a second link stage, to generate, based on the object code for each of the plurality of computer programs and the library, an executable file for each of the plurality of computer programs comprising executable code for the non-shared code and data of the computer program that is linked to the shared code and/or data via the shared memory addresses in the library; and loading the executable code from the executable files into the memory of the embedded system.

* * * * *